Patented Aug. 7, 1945

2,381,002

UNITED STATES PATENT OFFICE 2,381,002

CYCLIC ORGANOSILICON COMPOUNDS

Winton I. Patnode, Schenectady, N. Y., and Robert W. Schiessler, State College, Pa., assignors to General Electric Company, a corporation of New York No Drawing. Application March 4, 1942, Serial No. 433,330

4 Claims. (Cl. 260—607)

The present invention relates to organosilicon compounds. It is particularly concerned with chlorinated organosilicon compounds having the general formula $(Cl_2SiCH_2)_x$ wherein $x$ is equal to or greater than 3. The invention is specifically concerned with the novel compound, tri- (dichlorosilylmethylene) $(Cl_2SiCH_2)_3$ having the probable structural formula:

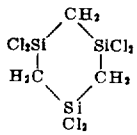

In our copending application Serial No. 433,-328 filed concurrently herewith and assigned to the same assignee as the present invention is disclosed and broadly claimed the method of preparing halogenated organosilicon compounds containing silicon atoms linked by carbon atoms by reacting dihalogenated hydrocarbons, such as methylene chloride, with heated silicon. That application is specifically concerned with, and contains claims directed to, acyclic reaction products represented by the formula

wherein X is a halogen atom, Y is hydrogen or is a halogen atom of the type represented by X, and $n$ is an integer and is at least 1 and not greater than 4.

The present application is specifically concerned with novel silicon-carbon compounds of the general formula $(Cl_2SiCH_2)_x$ wherein $x$ is equal to at least 3 obtained by effecting reaction between methylene chloride and heated silicon in the presence of nitrogen and a copper catalyst for the reaction. The reaction may be effected by maintaining the silicon and copper at an elevated temperature, e. g., a temperature of between about 280° C. and 300° C., during the reaction period.

To illustrate the process by which these organosilicon compounds may be prepared the following specific example is given:

Example

A stream of dry, oxygen-free nitrogen was passed through a reservoir of methylene chloride, $CH_2Cl_2$, at a rate of 300 c. c. per minute. The effluent mixture of nitrogen and methylene chloride vapors was passed into a heated tube filled with pellets of a silicon-copper contact mass containing 9 parts of silicon and 1 part copper which had been fired in hydrogen at 1050° C. for about two hours in accordance with the teachings set forth in the copending application of Winton I. Patnode, Serial No. 412,461, filed September 26, 1941, and assigned to the same assignee as the present invention. By holding the temperature of the methylene chloride reservoir between 25° and 27° C., methylene chloride vapor was carried into the reaction tube at the rate of 0.8 gram per minute. The use of a nitrogen atmosphere as a carrier and diluent as described herein is not part of our invention but is rather the subject matter of the copending application of M. M. Sprung and W. F. Gilliam, Serial No. 433,293, filed concurrently herewith and assigned to the same assignee as the present invention.

The reaction tube used in this example was about 24 inches long and 1½ inches in diameter. With the temperature of the tube and its contents held at 300° C. approximately 80 per cent of the methylene chloride either reacted with the silicon to form a number of organosilicon compounds, or condensed along with these compounds when the gaseous products passing from the exit end of the tube were condensed and collected in traps cooled by a mixture of ice and water. That portion of the methylene chloride which could not be accounted for was either swept through the condensing traps by the nitrogen flow or reacted with the silicon to form low boiling materials such as HCl, $SiH_2Cl_2$, etc., which were not completely recovered at the trap temperatures.

In addition to small quantities of low boiling chlorosilanes such as $SiH_2Cl_2$ and $SiHCl_3$, the condensate contained about equal parts by weight of unreacted methylene chloride and a high boiling fraction consisting principally of compounds of silicon in which the silicon atoms were linked by carbon atoms. The methylene chloride was separated by fractional distillation at atmospheric pressure leaving a fraction boiling above 155° C. This latter fraction was carefully fractionated at a reduced pressure (10 mm.) to separate compounds identified as being:

$Cl_3SiCH_2SiHCl_2$ Boiling point of 51.0–52.5° C. at 10 mm.

$Cl_3SiCH_2SiCl_3$ Boiling point of 63.7–65.0° C. at 10 mm. (184–5° C. at 756 mm.)

$[Cl_2SiCH_2]_3$ Melting point 81.0–82.5° C.

The tri(dichlorosilylmethylene) $[Cl_2SiCH_2]_3$, with which the present application is concerned was recovered from the fraction of the abovementioned high-boiling mixture which distilled over at temperatures between 120–137° C. at 10 mm. pressure. Purification of the compound was accomplished by repeated recrystallization thereof in the form of white, needle-like crystals melting at 81–82.5° C. The compound was found to be a trimer containing no Si–Si or Si–H bonds, 63 per cent chlorine, and 25.2 per cent silicon as compared with the calculated values of 62.8 per cent chlorine and 24.9 per cent silicon for this trimer.

Another liquid fraction was distilled over between 120° and 137° C. at 10 mm. pressure and was found to contain about 65.1 per cent chlorine. The residue boiling above 200° C. at 10 mm. pressure was a viscous, greenish-black liquid which contained 61.5 per cent chlorine and had the appearance of a high molecular weight, polymeric substance. This compound may be represented by the formula $[-SiCl_2CH_2-]_x$ where $x$ is greater than 3. Such poly-dichlorosilylmethylene compounds would theoretically contain 62.8 per cent chlorine.

These chlorinated organosilicon compounds may be used as intermediates in the preparation of resins similar to those described, for example, in Patents 2,258,218 and 2,258,220 issued to Eugene G. Rochow, either alone or admixed with other organosilicon halides such as the methyl silicon chlorides, the phenyl silicon chlorides, etc. Due to the reactivity of the chlorine atoms they may also be reacted with alcohols, Grignard reagents, etc., to form higher molecular weight derivatives which may be used as plasticizers.

What we claim as new and desire to secure by Letters Patent of the United States is:

1. A silicon compound having the formula $(Cl_2SiCH_2)_x$ wherein $x$ is equal to at least 3.
2. Tri-(dichlorosilylmethylene) having the formula $(Cl_2SiCH_2)_3$.
3. The method of preparing a poly-(dichlorosilylmethylene) which comprises effecting reaction at an elevated temperature between methylene chloride and silicon in the presence of a copper catalyst.
4. The method of preparing tri-dichlorosilylmethylene) which comprises effecting reaction between the methylene chloride component of a gaseous mixture comprising methylene chloride and nitrogen and the silicon component of a mixture of silicon and copper held at a temperature of between about 280° and 300° C., condensing the liquid products of reaction, fractionating the liquid products, recovering the fraction boiling between 120° and 137° C. at 10 mm. pressure and separating therefrom the solid tri-(dichlorosilylmethylene) melting at 81.0–82.5° C.

WINTON I. PATNODE.
ROBERT W. SCHIESSLER.